United States Patent
Guan et al.

(10) Patent No.: US 9,328,886 B2
(45) Date of Patent: May 3, 2016

(54) SYSTEM AND METHOD FOR CONTROLLING HEAD LAMP FOR VEHICLE

(71) Applicant: SL Corporation, Daegu (KR)

(72) Inventors: Jeong Myong Guan, Gyeonsangbuk-Do (KR); Hansub Lee, Gyeonsangbuk-Do (KR); Se Young Bang, Gyeonsangbuk-Do (KR)

(73) Assignee: SL Corporation, Daegu (KR)

( * ) Notice: Subject to any disclaimer, the term of this patent is extended or adjusted under 35 U.S.C. 154(b) by 99 days.

(21) Appl. No.: 14/015,458

(22) Filed: Aug. 30, 2013

(65) Prior Publication Data

US 2014/0063824 A1    Mar. 6, 2014

(30) Foreign Application Priority Data

Aug. 31, 2012    (KR) .................. 10-2012-0096588

(51) Int. Cl.
  *G08G 1/14* (2006.01)
  *F21S 8/10* (2006.01)
  *B60Q 9/00* (2006.01)

(52) U.S. Cl.
  CPC ................. *F21S 48/10* (2013.01); *B60Q 9/008* (2013.01); *B60Q 2400/50* (2013.01)

(58) Field of Classification Search
  CPC .......... B60J 3/02; B60J 10/0037; B60J 1/002; B60J 1/183; B60J 1/2011; B60J 1/2088; B60J 3/002; B60J 3/0204; B60J 3/0213; B60J 3/0286; B60J 7/028; B60R 1/12; B60R 19/52; B60R 1/082; B60R 2001/1269

USPC ........ 340/932.2, 901, 902, 903, 425.5, 426.1, 340/426.24, 426.28, 905
  See application file for complete search history.

(56) References Cited

U.S. PATENT DOCUMENTS

| | | | | |
|---|---|---|---|---|
| 4,879,636 A | * | 11/1989 | Yamagishi et al. | 362/539 |
| 4,967,319 A | * | 10/1990 | Seko | 362/466 |
| 5,896,085 A | * | 4/1999 | Mori et al. | 340/469 |
| 6,000,816 A | * | 12/1999 | Serizawa et al. | 362/297 |
| 7,267,465 B2 | * | 9/2007 | Mochizuki et al. | 362/539 |
| 2005/0162856 A1 | | 7/2005 | Ito et al. | |
| 2006/0187010 A1 | | 8/2006 | Berman | |

(Continued)

FOREIGN PATENT DOCUMENTS

| | | |
|---|---|---|
| CN | 1153116 A | 7/1997 |
| CN | 101608763 A | 12/2009 |

(Continued)

OTHER PUBLICATIONS

European Search Report for European Application No. 13182385, dated Dec. 2, 2013.

*Primary Examiner* — Daniel Previl
(74) *Attorney, Agent, or Firm* — Mintz Levin Cohn Ferris Glovsky and Popeo, P.C.; Kongsik Kim; Colleen H. Witherell

(57) ABSTRACT

A system and method for controlling a head lamp for a vehicle are provided. The system includes a first head lamp that is configured to block a part of a first light emitted from a first light source to form a first shaded line on a front road of a vehicle. In addition, a second head lamp is configured to block a part of a second light emitted from a second light source to form a second shaded line on the front road of the vehicle.

18 Claims, 15 Drawing Sheets

(56) References Cited

U.S. PATENT DOCUMENTS

| | | | |
|---|---|---|---|
| 2008/0049150 A1 | 2/2008 | Herbin et al. | |
| 2009/0129083 A1* | 5/2009 | An | 362/243 |
| 2009/0251912 A1* | 10/2009 | Kino | B60Q 3/004 362/492 |
| 2010/0052550 A1* | 3/2010 | Kobayashi | 315/158 |
| 2011/0170308 A1* | 7/2011 | Kinoshita et al. | 362/516 |

FOREIGN PATENT DOCUMENTS

| | | |
|---|---|---|
| CN | 101934757 A | 1/2011 |
| DE | 102 48 650 A1 | 5/2004 |
| DE | 102006048503 A1 | 4/2008 |
| EP | 2233356 A1 | 9/2010 |
| JP | 5-85222 A | 4/1993 |
| JP | 03243440 * | 6/1993 |
| JP | 1995-329660 A | 12/1995 |
| JP | 2003-285685 A | 10/2003 |
| JP | 02009227088 * | 10/2009 |
| JP | 02009227088 A * | 10/2009 |
| JP | 2010-026759 A | 2/2010 |
| JP | 2012-011937 A | 1/2012 |
| KR | 10-2008-0008527 A | 1/2008 |
| KR | 10-2012-0011213 A | 2/2012 |
| WO | 2011-060860 A1 | 5/2011 |

* cited by examiner

SYSTEM AND METHOD FOR CONTROLLING HEAD LAMP FOR VEHICLE

CROSS-REFERENCE TO RELATED APPLICATION

This application claims priority from Korean Patent Application No. 10-2012-0096588 filed on Aug. 31, 2012 in the Korean Intellectual Property Office, which is incorporated by reference herein.

BACKGROUND

The present invention relates to a system and a method for controlling a head lamp for a vehicle, and more particularly, to a system and a method for controlling a head lamp for a vehicle that displays a width line of a vehicle.

In general, a vehicle includes various lamps which have a lighting function that allows a driver to easily recognizes objects at the periphery of the vehicle when the vehicle is driven at night (e.g., dark lighting), and a signal function that informs a driving state of a driver's vehicle to other vehicles. For example, a head lamp, a fog lamp, and the like are provided for the purpose of the lighting function, and a direction indicating lamp, a tail lamp, a brake lamp, a side marker, and the like are provided for the purpose of the signal function. In general, as the lamp for a vehicle, a light source such as a halogen lamp or a high intensity discharge (HID) lamp has been mainly used.

Recently, as the light source, a light emitting diode is being used, a color temperature of the light emitting diode is about 5,500 K, which is similar to a color temperature of sun light, to reduce eye strain that causes fatigue, and the light emitting diode minimizes a size of the lamp to increase a degree of design freedom of the lamp, and also has economic efficiency due to a semi-permanent lifespan.

Further, an attempt has been made to overcome the complicated configuration of the lamp and an increase in the number of process steps in the related art, and there is a tendency to overcome problems in terms of an extension of the lifespan of the lamp using the characteristics of the light emitting diode and overcome problems in terms of a space limitation of the lamp using a small size light emitting diode. When the light emitting diode is used, one or more light emitting diodes may be used to irradiate light in each beam pattern and secure a sufficient quantity of light.

Meanwhile, when the vehicle is driven at night, the vehicle may pass through narrow roads, through a narrow width between the vehicles, or may be parked in a narrow parking lot. When the driver is unsure a vehicle width of the vehicle the possibility of a minor collision increases when the driver drives the vehicle in a narrow zone. For example, as illustrated in FIG. 1, when a bicycle, a motorcycle 20, or the like is driven at the periphery of a road, when the driver intends to drive past the corresponding bicycle or the motorcycle 20 while miscalculating the vehicle width of a driver's vehicle 10, the vehicle may unintentionally come into contact with or collide with the bicycle and the motorcycle 20, and as a result, there is a likelihood that an injury may occur.

In addition, as illustrated in FIG. 2, when a plurality of vehicles are parked in a narrow position, when the driver does not recognize the vehicle width of the driver's vehicle or the driver erroneously drives the vehicle to pass through a narrow zone while traveling close to an oncoming vehicle 30, there is a possibility that a minor collision may occur between the driver's vehicle 10 and the oncoming vehicle 30 or other stopped vehicles 40.

In general, minor collisions are a part of the vehicle accidents, and minor collisions may occur due to drivers erroneously calculating the vehicle width of the driver's vehicle. Therefore, a countermeasure, which allows the driver to recognize the vehicle width, may be required.

Furthermore, as illustrated in FIG. 3, the driver's vehicle 10 may be unintentionally moved away from a traffic lane in a driving path L1 in which the driver's vehicle 10 is driven, and this may lead to an accident. Particularly, when the vehicle is driven at night, due to various reasons such as driving while drowsy, the driver may not maintain the driving path in which the vehicle is driven. Therefore, it may be necessary for the driver to immediately recognize whether the vehicle is driven in a state in which the vehicle is biased to one side of the driving path or the vehicle passes the traffic lane.

SUMMARY

The present invention provides a system and a method for controlling a head lamp for a vehicle which allow a driver to be able to safely drive or park a vehicle in a narrow space. The objects of the present invention are not limited to the aforementioned object, and other objects, which are not mentioned above, will be apparently understood by the person skilled in the art from the following description.

According to the system and the method for controlling a head lamp for a vehicle of the present invention, as described above, there are one or more effects as follows.

According to the system for controlling a head lamp for a vehicle according to the exemplary embodiments of the present invention, the pair of shaded lines, which correspond to the vehicle width, may be formed on the light distribution pattern irradiated to the front side of the vehicle to allow the vehicle driver to safely drive or park the vehicle in a narrow space based on the pair of shaded lines. In addition, the pair of shaded lines by which the driver may recognize the vehicle width may be formed, thereby preventing an unintentional minor collision with other vehicles, bicycles, or motorcycles, or an injury accident.

The effects of the present invention are not limited to the aforementioned effects, and other effects, which are not mentioned above, will be apparently understood by the person skilled in the art from the recitations of the claims.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
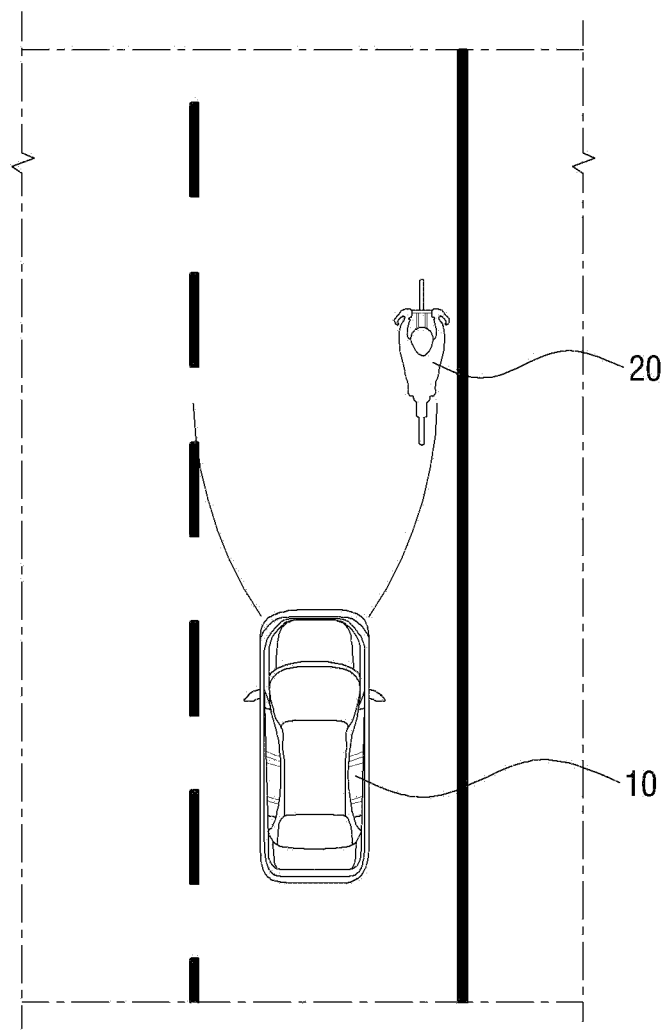
FIGS. 1 to 3 are exemplary views illustrating a light distribution pattern according to a head lamp structure of the related art.
Figure 2:
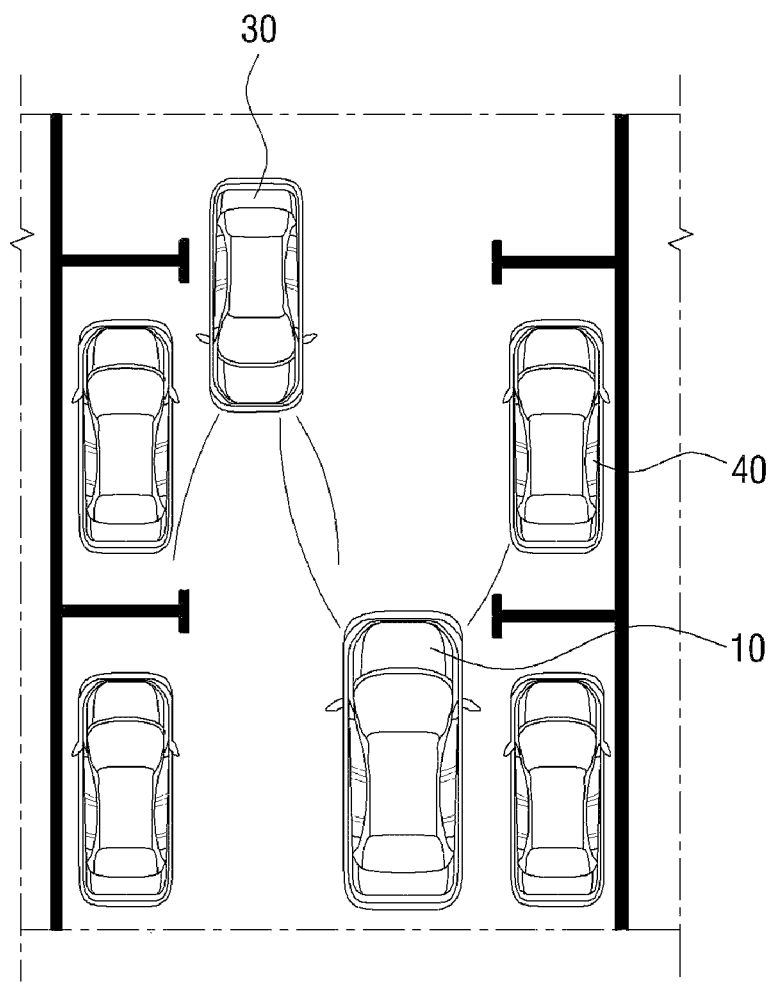
Figure 3:
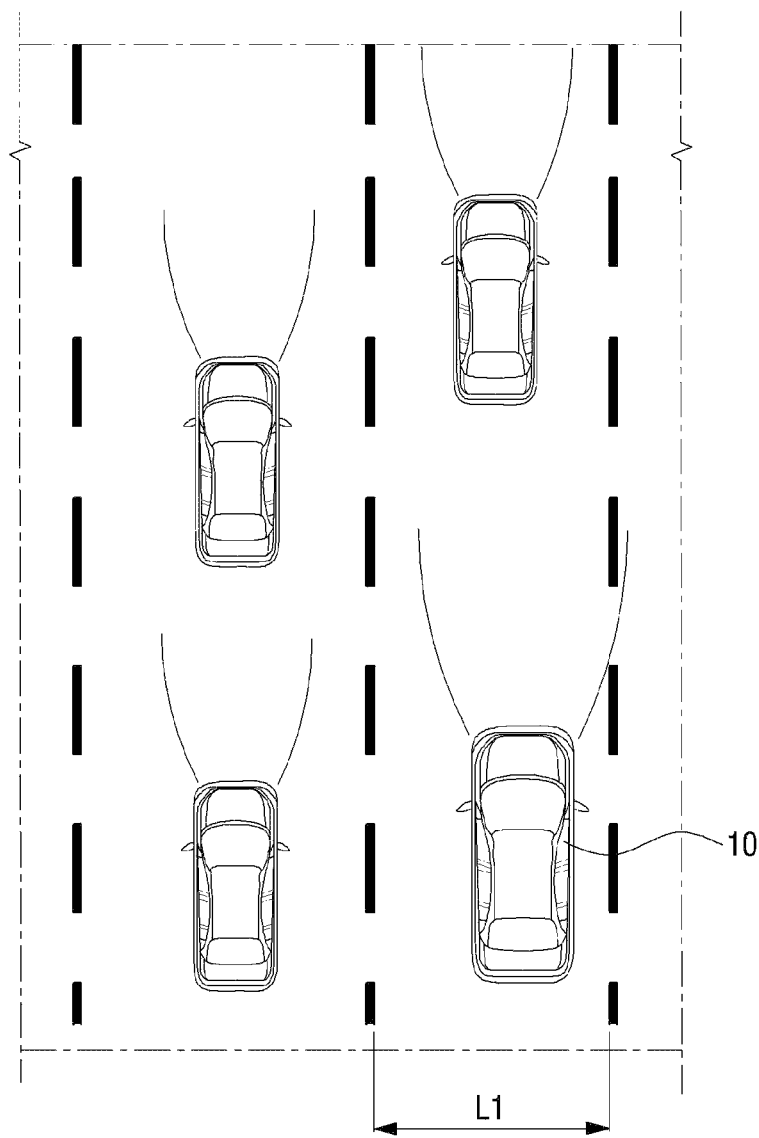

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 4:
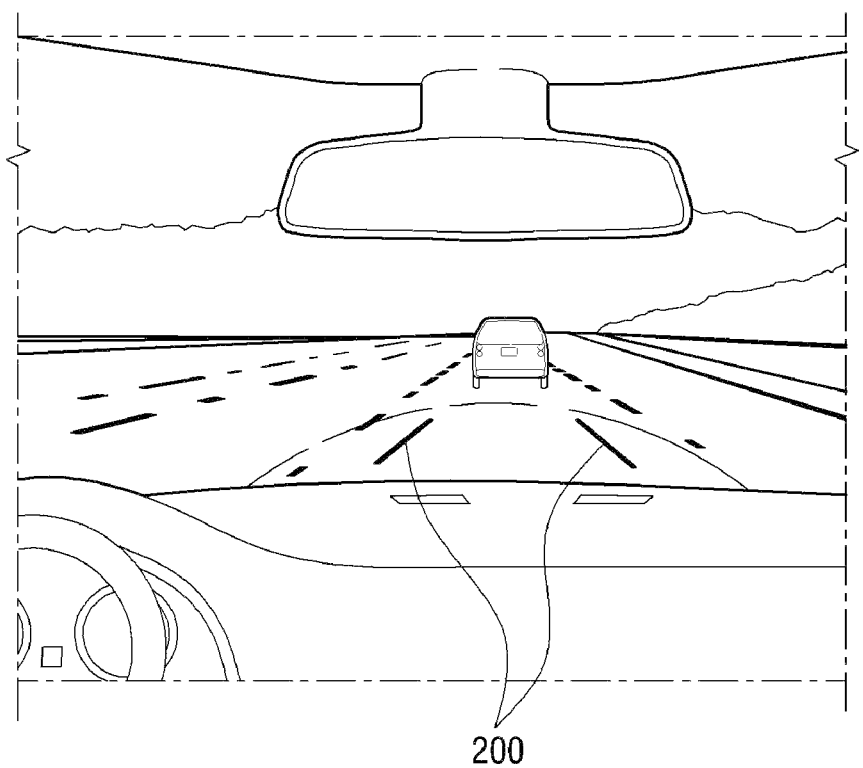
FIG. 4 is an exemplary view illustrating shaded lines formed by a system for controlling a head lamp for a vehicle according to exemplary embodiments of the present invention.
Figure 5:
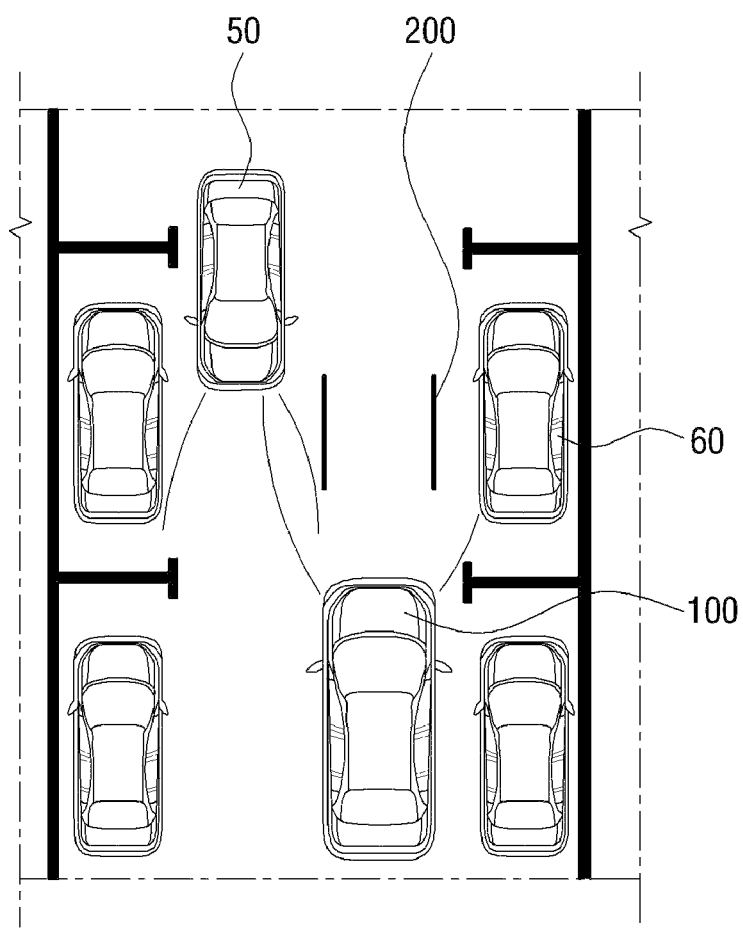
FIGS. 5 to 7 are exemplary views illustrating shaded lines formed by the system for controlling a head lamp for a vehicle of FIG. 4 in various situations according to an exemplary embodiment of the present invention.
Figure 6:
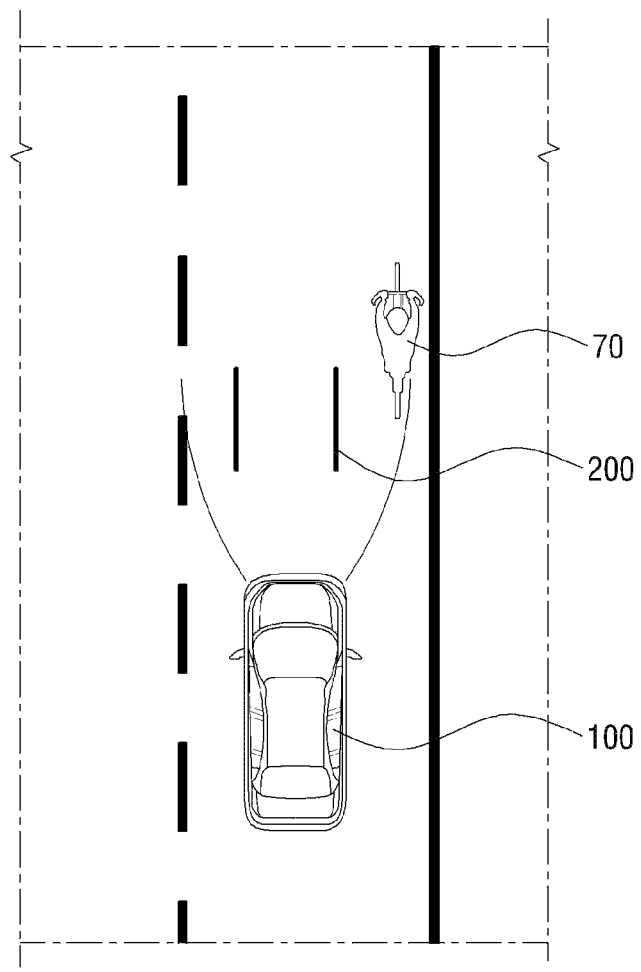
Figure 7:
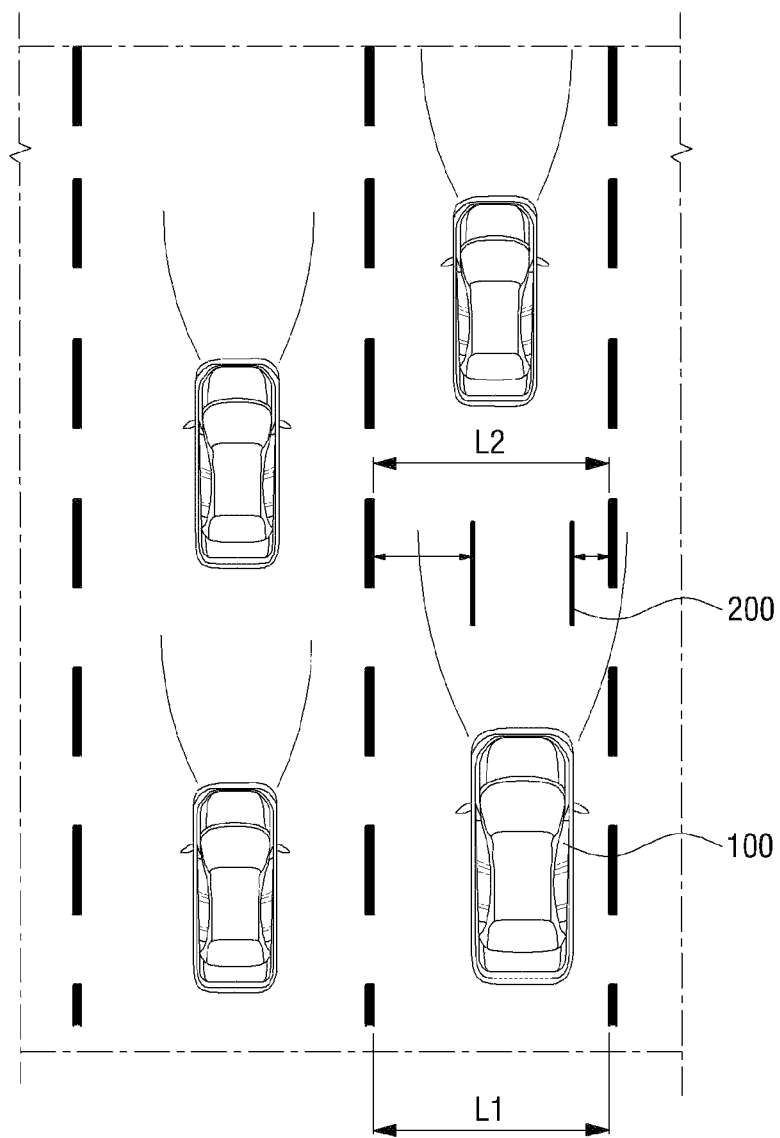

Hereinafter, a system for controlling a head lamp for a vehicle according to exemplary embodiments of the present invention will be described with reference to FIGS. 4 to 7. FIG. 4 is an exemplary view illustrating shaded lines formed by a system for controlling a head lamp for a vehicle according to exemplary embodiments of the present invention, and FIGS. 5 to 7 are exemplary views illustrating shaded lines formed by the system for controlling a head lamp for a vehicle of FIG. 4 in various situations.

Referring to FIG. 4, the system for controlling a head lamp for a vehicle may be configured to irradiate light toward a front side of a vehicle, and may be configured to block a part of the light to form a pair of shaded lines 200. The pair of shaded lines 200 may be formed along the front side of the vehicle, the pair of shaded lines 200 refers to a shaded region which is formed by blocking a part of a low beam irradiated from the head lamp, and may be in the form of a bar or a slit that is elongated in a proceeding direction of the vehicle. The pair of shaded lines 200 may have about the same length and the same thickness as each other, and the length and the thickness thereof may vary within a predetermined range.

As illustrated in FIG. 4, when the vehicle is driven, the pair of shaded lines 200 may be formed toward the front side of the vehicle to operate as a guide when the vehicle is driven or when the vehicle is parked. To this end, an interval between the pair of shaded lines 200 may be set to be about the same as a vehicle width. In other words, due to perspective sensation, it may be difficult for the vehicle driver to determine whether the vehicle may pass through a narrow region at the front side, or whether the vehicle is being driven corresponding to a center of a driving path, and particularly, a minor collision or the like may occur when the vehicle driver may not accurately sense the vehicle width at night when a visual field is not sufficiently secured.

To prevent the aforementioned difficulty, the system for controlling a head lamp for a vehicle may be configured to form the shaded lines having about the same width as the vehicle width by blocking a part of the light of the head lamp which is irradiated toward the front side.

Referring to FIG. 5, when a plurality of vehicles are parked in a narrow position, the pair of shaded lines 200 may be formed to allow the vehicle driver to recognize the vehicle width while the vehicle 100 passes close to an oncoming vehicle 50, or prevent the vehicle driver from erroneously driving the vehicle through a narrow zone, thereby preventing a minor collision with the oncoming vehicle 50 or other stopped vehicles 60. In other words, since the pair of shaded lines 200 have about the same width as the vehicle width of the vehicle 100, the driver of the vehicle 100 may objectively determine in advance whether the vehicle may pass through the narrow zone, while comparing the width of the narrow zone with the vehicle width of the vehicle 100, before the vehicle 100 passes through the narrow zone.

Referring to FIG. 6, when a bicycle, a motorcycle 70, or the like travels at a periphery of the road, the driver may recognize in advance the vehicle width of the vehicle 100 using the pair of shaded lines 200 when the head lamp irradiates light, and when the driver intends to pass the corresponding bicycle or the motorcycle 70, a situation in which the vehicle unintentionally comes into contact with or collides with the bicycle or the motorcycle 70 may be prevented. Furthermore, a driver of the bicycle or the motorcycle 70 may confirm the shaded lines 200 of the rear vehicle by viewing the side thereof, and when the bicycle or the motorcycle 70 is near the shaded lines 200 (e.g., within a predetermined distance from the shaded lines 200), the driver of the bicycle or the motorcycle 70 may allow the bicycle or the motorcycle 70 to be spaced apart from the shaded lines 200 by converting the direction of the bicycle or the motorcycle 70, thereby preventing an accident.

Referring to FIG. 7, the vehicle 100 may be unintentionally moved away from a traffic lane of a driving path L2 in which the vehicle 100 is driven, and particularly, due to various reasons such as driving while drowsy when the vehicle 100 is driven at night, the vehicle 100 may not remain in the driving path L2 in which the vehicle 100 is driven. In particular, the pair of shaded lines 200 may be generated on the road when the head lamp irradiates light to allow the driver may to determine whether the vehicle 100 is present in the driving path L2, and thus the driver may recognize whether the vehicle 100 is biased to one side of the driving path L2 of the vehicle 100, or whether the vehicle 100 is driven in a state in which the vehicle 100 passes the traffic lane.

Figure 8:
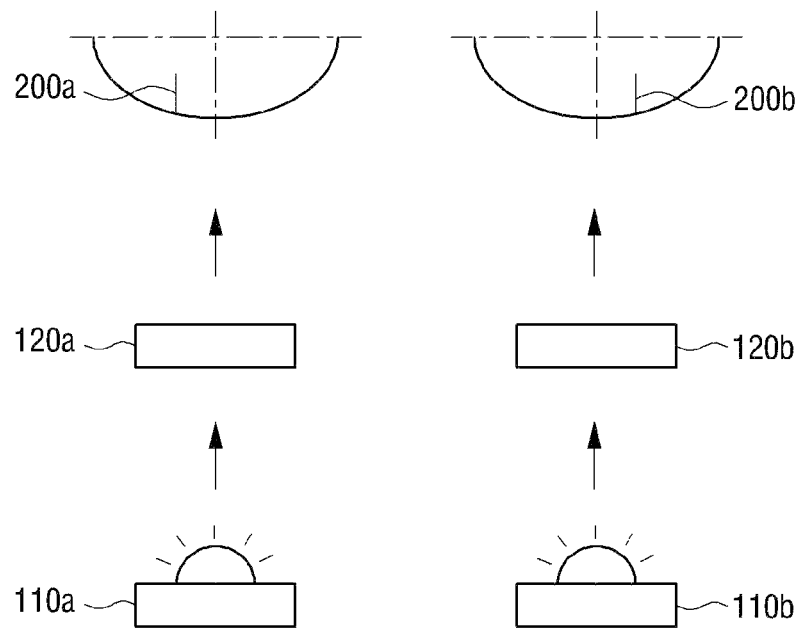
FIG. 8 is an exemplary view illustrating a schematic structure of the system for controlling a head lamp for a vehicle according to the exemplary embodiment of the present invention.
Figure 9:
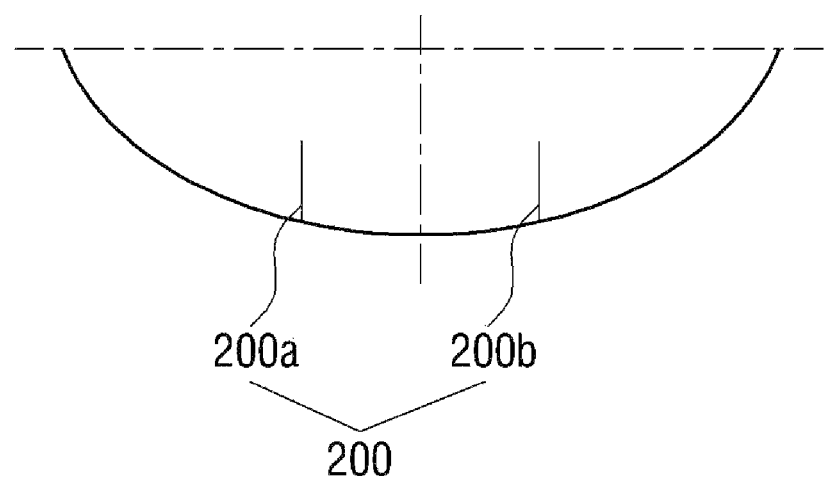
FIG. 9 is an exemplary view illustrating a light distribution pattern formed by the system for controlling a head lamp for a vehicle of FIG. 8 according to the exemplary embodiment of the present invention.
Figure 10:
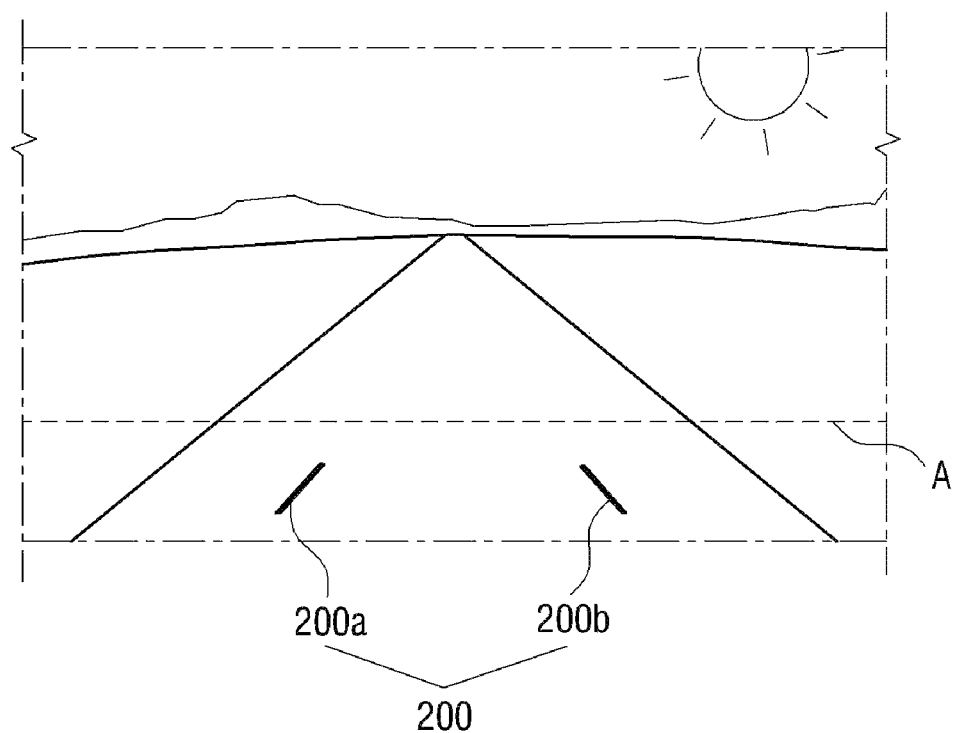
FIGS. 10 and 11 are exemplary views illustrating a configuration in which the light distribution pattern of FIG. 9 is irradiated toward a front side of a road according to the exemplary embodiment of the present invention.
Figure 11:
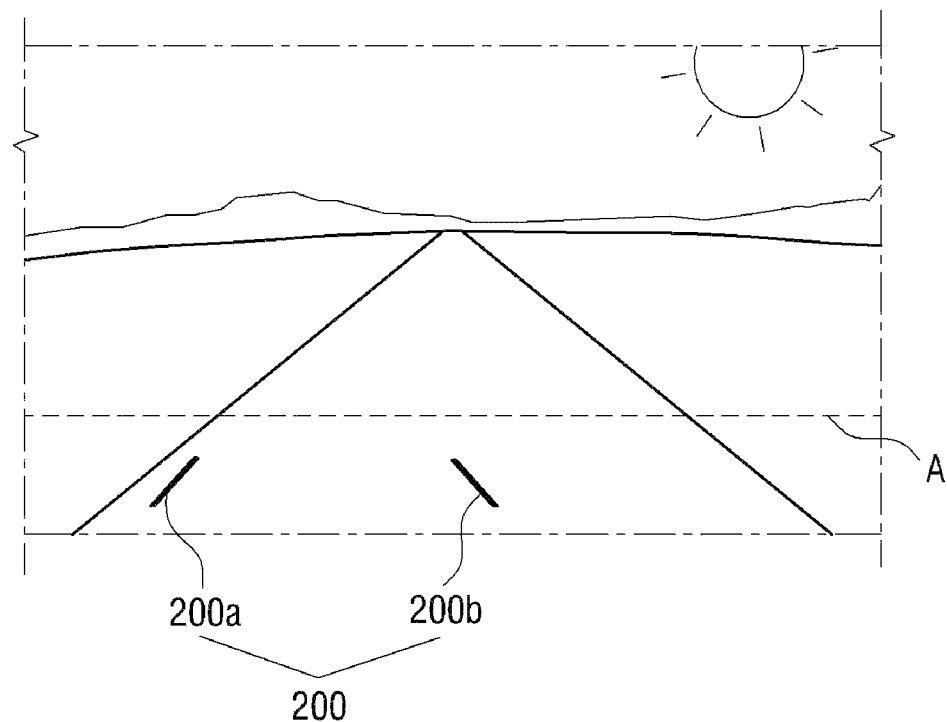

Hereinafter, the system for controlling a head lamp for a vehicle according to the exemplary embodiment of the present invention will be described with reference to FIGS. 8 to 11. FIG. 8 an exemplary view illustrating a schematic structure of the system for controlling a head lamp for a vehicle according to the exemplary embodiment of the present invention, FIG. 9 is an exemplary view illustrating a light distribution pattern formed by the system for controlling a head lamp for a vehicle of FIG. 8, and FIGS. 10 and 11 are exemplary views illustrating a configuration in which the light distribution pattern of FIG. 9 is irradiated toward a front side of a road.

The system for controlling a head lamp for a vehicle may include a first head lamp configured to block a part of a first light emitted from a first light source 110*a* to form a first shaded line 200*a* on a front road of the vehicle, and a second head lamp configured to block a part of a second light emitted from a second light source 110*b* to form a second shaded line 200*b* on the front road of the vehicle. For example, the first head lamp and the second head lamp may be left and right head lamps of the vehicle, respectively, and the order of the left and right head lamps may be changed.

Referring to FIG. 8, a predetermined light may be emitted from the left light source 110*a* of the head lamp, and a predetermined light distribution pattern may be formed through a configuration such as an optical shield (not illustrated), and simultaneously or sequentially, when the light passes over a predetermined light blocking body 120*a*, the light distribution pattern may be formed at the front side, and the first shaded line 200*a* may be formed.

The first shaded line 200*a* is a region having a brightness value, which may be less than a brightness value at the periphery thereof or about zero, on the light distribution pattern, and may have a predetermined brightness value or less, for example, brightness of about 100 cd or less. The first shaded line 200*a* may be formed to cause the first shaded line 200*a* having a slit or bar shape to be formed extended in a predetermined direction when the head.

In addition to the slit or bar shape, the first shaded line 200a may have other shapes, which may display the vehicle width of the vehicle, without limitation. For example, the first shaded line 200a may be displayed in a shape that partially includes a curved line in addition to a straight line. In addition, the first shaded line 200a is illustrated in the form of a continuous line that is not cut, but the present invention is not limited thereto, and may be configured in the form of a dotted line, a dashed line, or the like within a distinguishable range of the vehicle driver.

Similarly, a predetermined light may be emitted from the right light source 110b of the head lamp, and a predetermined light distribution pattern may be formed through a configuration such as an optical shield (not illustrated), and simultaneously or sequentially, when the light passes over a predetermined light blocking body 120b, the light distribution pattern may be formed at the front side, and the second shaded line 200b may be formed.

The second shaded line 200b is also a region that has a brightness value, which is less than a brightness value at the periphery thereof or about zero, on the light distribution pattern, and may have a predetermined brightness value or less, for example, brightness of about 100 cd or less. The second shaded line 200b may be formed to cause the second shaded line 200b having a slit or bar shape to be formed extended in a predetermined direction when the head lamp irradiates light at night.

In several other exemplary embodiments, the first shaded line 200a and the second shaded line 200b may have different brightness or the same brightness. Similarly, the second shaded line 200b may also have other shapes that may display the vehicle width, in addition to the slit or bar shape, without limitation. For example, the second shaded line 200b may be displayed in a shape that partially includes a curved line in addition to a straight line.

Referring to FIG. 9, as described above, the light distribution irradiated from the respective left and right head lamps may be mixed to form a single light distribution pattern. On the mixed light distribution pattern, the first shaded line 200a formed by one side first head lamp and the second shaded line 200b formed by the other side second head lamp may form the pair of shaded lines 200, and as described above, a distance between the first shaded line 200a and the second shaded line 200b may be about the same as the vehicle width, or may be substantially the same as the vehicle width within an allowable predetermined error range. In the present specification, the distance between the first shaded line 200a and the second shaded line 200b may be the distance between the first shaded line 200a and the second shaded line 200b on the light distribution pattern projected on the road, and may have a difference with the vehicle width within a predetermined range. For example, an error within a range in which it is difficult for the vehicle driver to detect the error may be allowable.

In particular, the vehicle width may be a width between a left outermost point of the vehicle, for example, an outermost point of a left side mirror and a right outermost point of the vehicle, for example, an outermost point of a right side mirror. The distance between the first shaded line 200a and the second shaded line 200b on the light distribution pattern projected on the road may be a concept that includes thicknesses of the first shaded line 200a and the second shaded line 200b, and may also be a concept that means a distance between outermost lines of sides adjacent to the shaded lines except for the thicknesses of the shaded lines. Therefore, the pair of shaded lines 200 may be formed on the head lamp pattern, for example, the low beam pattern projected on the road, and the pair of shaded lines 200 may mean the vehicle width to provide guide lines when the vehicle driver needs to pass through a narrow space.

Referring to FIGS. 10 and 11, an exemplary configuration and an exemplary function of the pair of shaded lines 200, which are implemented by the system for controlling a head lamp for a vehicle according to an exemplary embodiment of the present embodiment, are illustrated.

According to the system for controlling a head lamp for a vehicle, the pair of shaded lines 200 may be formed on the head lamp light distribution pattern projected on the front road of the driving vehicle. As illustrated, the first shaded line 200a and the second shaded line 200b may be formed in a range in which the first shaded line 200a and the second shaded line 200b do not cross a reference line A illustrated within a predetermined distance from the vehicle. In other words, the first shaded line 200a and the second shaded line 200b may be formed between the vehicle and the reference line A.

Particularly, the pair of shaded lines 200 may be formed within a range that satisfies regulations on the light distribution in relation to the low beam in a short distance region, and the distance between the vehicle and the reference line A of the pair of shaded lines 200 may be about 25 m based on the regulations. When the pair of shaded lines 200 is formed in a region where the distance between the vehicle and the reference line A exceeds 25 m, since a point at which the pair of shaded lines 200 is formed may be adjacent to the front side of the vehicle, that is, about zero degrees as a vertical axis on the light distribution graph, the regulations on the light distribution may not be satisfied based on the thicknesses of the pair of shaded lines 200. When the pair of shaded lines 200 are formed in a region where the distance between the vehicle and the reference line A exceeds 25 m, the pair of shaded lines 200 may not be formed on the front road, or only a part of the pair of shaded lines 200 may be formed on the road. Therefore, the pair of shaded lines 200 may be formed within a predetermined distance based on a foremost side of the vehicle, for example, in the range of about 25 m.

In addition, as illustrated, the first shaded line 200a and the second shaded line 200b may be parallel to each other, and the first shaded line 200a and/or the second shaded line 200b may be parallel to the proceeding direction of the vehicle.

FIG. 10 illustrates a state in which the shaded lines 200, which are formed on the light distribution pattern projected on the road, are formed at a substantial center of the road, and may mean that the vehicle, which is driven in a predetermined traffic lane, is driven while maintaining the position of the vehicle at a substantially central position of the traffic lane. In particular, the above driving situation may be considered a normal driving state and a risk of an accident may decrease compared to when the vehicle is driven while being biased to one side of the traffic lane.

However, FIG. 11 illustrates the shaded lines 200, formed to be biased to one side of the road, and may mean that the vehicle, which is driven in a predetermined traffic lane, is driven while being biased to one side of the traffic lane. In particular, a risk of contact and collision with a vehicle which is being driving in another traffic lane may increase, and the above situation may be recognized by the driver of the rear vehicle as a risk factor. Therefore, after the driver of the vehicle confirms the shaded lines 200 formed at the front side of the driver's vehicle, and then compares the shaded lines 200 with the shape of the road traffic lane, the driver may recognize that the vehicle is biased to one side of the traffic lane or when the vehicle is crossing the traffic lane the vehicle may be moved to the substantial central position of the traffic lane by operating a steering or the like.

In several other exemplary embodiments, the system for controlling a head lamp for a vehicle may further include an imaging device (e.g., a camera, a video camera, or the like) configured to obtain an image of the front road, the shaded lines 200 and a shape of the road or a shape of the traffic lane may be extracted and compared, and when the shaded lines 200 are biased from the center of the road or the traffic lane at a predetermined range or more for a predetermined time period or more, the information may be transmitted to the driver to prevent a vehicle accident due to driving while drowsy or a careless driving.

Further, the first shaded line 200a and the second shaded line 200b may be formed when the first head lamp and the second head lamp are turned on. In particular, the first shaded line 200a and the second shaded line 200b may also be formed when the illuminance of the exterior of the vehicle 100 is a predetermined illuminance or less.

An auto light function for a vehicle may be configured to automatically turn on a head lamp based on a sensing signal of a sensing unit when illuminance is lowered, and may be performed when a multi-function switch in association with auto light function, which is disposed in a driver's seat, is set to an auto mode. Therefore, the system for controlling a head lamp for a vehicle may be configured to interwork with the auto light function for a vehicle to form the first shaded line 200a and the second shaded line 200b when the illuminance of the exterior of the vehicle 100 is the predetermined illuminance or less. Further, the first shaded line 200a and the second shaded line 200b may be released when the illuminance of the exterior of the vehicle 100 exceeds the predetermined illuminance, thereby providing convenience to a driver and reducing power consumption of a vehicle.

In addition, the first shaded line 200a and the second shaded line 200b may also be formed in conjunction with a light distribution pattern in one mode of a plurality of modes of an adaptive front lighting system. The adaptive front lighting system (AFLS) is a system that converts a light distribution pattern based on a driving condition of a vehicle (e.g., a running speed of a vehicle, a road surface condition, and a weather condition), and may include light distribution patterns in a normal driving mode, a downtown driving mode, a highway driving mode, a wet road driving mode, and a high beam driving mode.

As compared to a general low beam, the light distribution pattern in the normal driving mode may have an improved light quantity while maintaining a visual field for an opposite driving path, the light distribution pattern in the downtown driving mode may be applied when the vehicle 100 is driven at the predetermined speed or less, and may be suitable when the vehicle 100 is driven in a downtown environment where brightness of surrounding illumination is maintained at a certain extent or greater. In addition, the light distribution pattern in the highway driving mode is suitable when the vehicle 100 is driven on the highway or the road of which a substantial portion of the road is a straight.

Further, the light distribution pattern in the wet road driving mode is suitable for allowing the vehicle 100 to block a part of light at the front side of the vehicle 100 to prevent light reflected from a wet road surface when it rains from obstructing a visual field of a driver of an oncoming vehicle. In addition, the light distribution pattern in the high beam driving mode is suitable for securing a long-distance visual field and detecting an obstacle when the vehicle 100 is driven at night when there is no oncoming vehicle or vehicle at the front side of the vehicle 100.

Accordingly, the system for controlling a head lamp for a vehicle may interwork with the adaptive front lighting system, and the first shaded line 200a and the second shaded line 200b may be formed in conjunction with any one light distribution pattern in the normal driving mode, the downtown driving mode, the highway driving mode, the wet road driving mode, and the high beam driving mode of the adaptive front lighting system. In particular, even in various changes in environment, the first shaded line 200a and the second shaded line 200b may be formed to fit each change in environment, thereby enhancing a driver's visibility.

Figure 12:
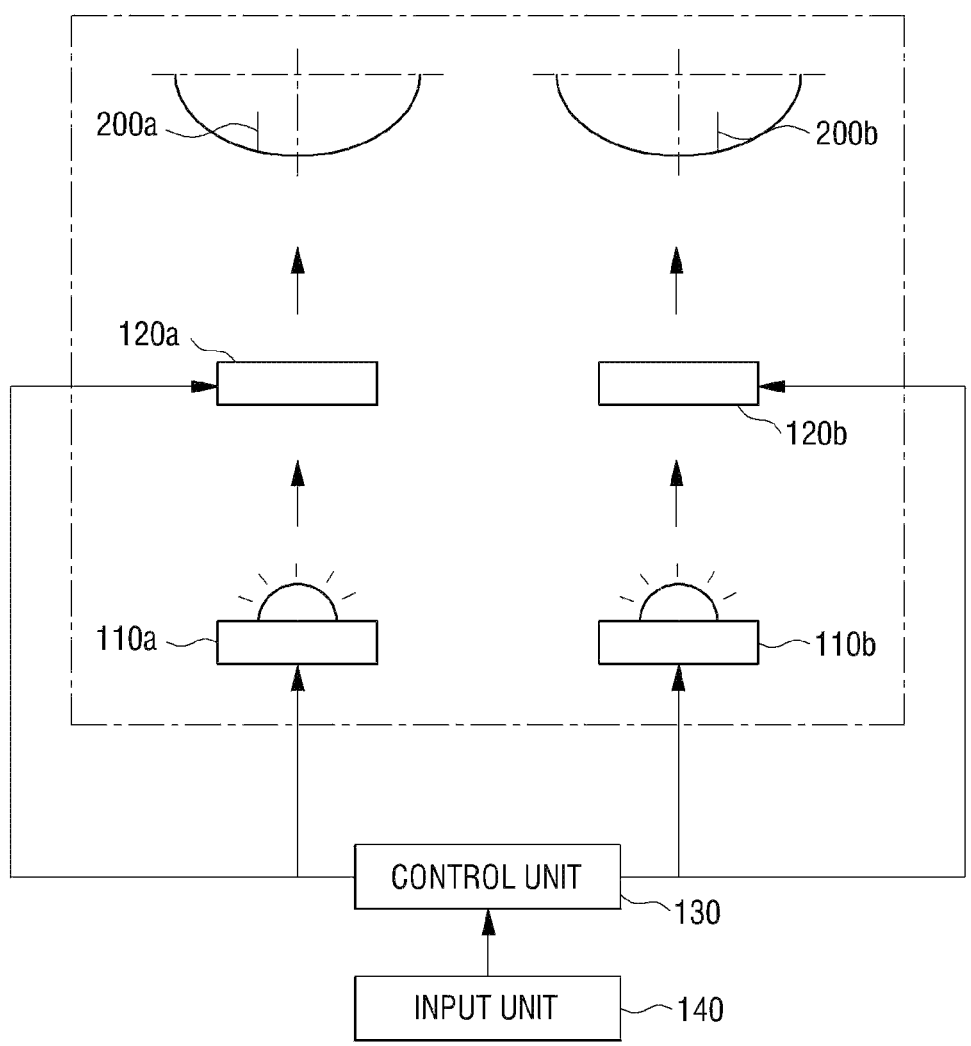
FIG. 12 is a view illustrating a schematic structure of a system for controlling a head lamp for a vehicle according to another exemplary embodiment of the present invention.

Hereinafter, a system for controlling a head lamp for a vehicle according to another exemplary embodiment of the present invention will be described with reference to FIG. 12. FIG. 12 is an exemplary view illustrating a schematic structure of the system for controlling a head lamp for a vehicle according to another exemplary embodiment of the present invention.

The system for controlling a head lamp for a vehicle according to another exemplary embodiment of the present invention may include a first head lamp configured to block a part of a first light emitted from a first light source 110a to form a first shaded line 200a on a front road of the vehicle, and a second head lamp configured to block a part of a second light emitted from a second light source 110b to form a second shaded line 200b on the front road of the vehicle. In addition, the system may further include a controller 130 configured to operate the first head lamp and the second head lamp, and the first shaded line and/or the second shaded line may be formed or released based on a control signal of the controller 130.

In other words, as illustrated in FIG. 12, signals for operating the light sources 110a and 110b and light blocking bodies 120a and 120b of the left and right head lamps may be transmitted via the controller 130, and an operation of switching on and off the light sources 110a and 110b of the left and right head lamps, illuminance thereof, or the like may be controlled by the respective signals. In addition, a signal, which operates the light blocking bodies 120a and 120b, may be transmitted to operate the light blocking bodies 120a and 120b by the signal to form the shaded lines or the operations of the light blocking bodies 120a and 120b may be stopped by the signal to not form the shaded lines.

The control signals of the controller 130 may be generated and transmitted by a predetermined value or an input of a user and may also be manually generated by an input unit 140 based on a driver selection.

Figure 13:
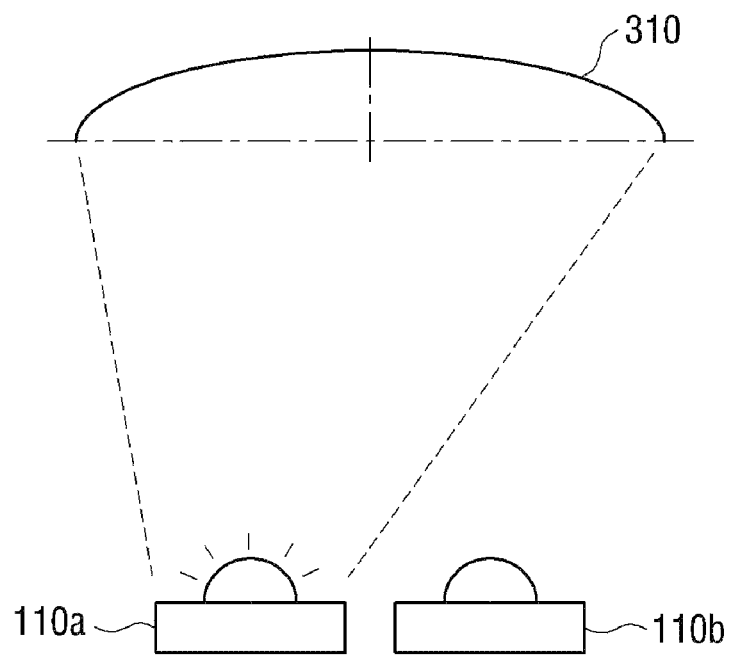
FIGS. 13 and 14 are exemplary views illustrating a schematic structure of a system for controlling a head lamp for a vehicle according to yet another exemplary embodiment of the present invention.
Figure 14:
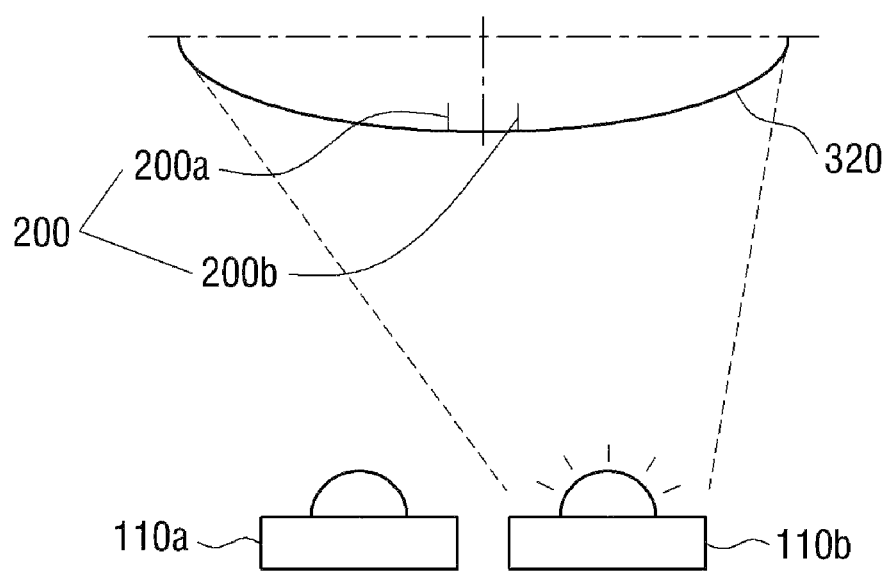

Hereinafter, a system for controlling a head lamp for a vehicle according to yet another exemplary embodiment of the present invention will be described with reference to FIGS. 13 and 14. FIGS. 13 and 14 are exemplary views illustrating a schematic structure of a system for controlling a head lamp for a vehicle according to yet another exemplary embodiment of the present invention.

The system for controlling a head lamp for a vehicle may include a first head lamp configured to form a high beam light distribution pattern at a front side of a vehicle and a second head lamp configured to form a low beam light distribution pattern at the front side of the vehicle, and the second head lamp may form a pair of shaded lines in a part of the low beam light distribution pattern.

Referring to FIGS. 13 and 14, in the system for controlling a head lamp for a vehicle according to the present exemplary embodiment, a high beam light distribution pattern 310 may be irradiated from a first light source 110a configuring the first head lamp, and a low beam light distribution pattern 320 may be irradiated from a second light source 110b configuring the second head lamp. In other words, the first head lamp that irradiates the high beam and the second head lamp that irradiates the low beam may be configured independently from each other. In addition, the left and right head lamps may include a plurality of head lamps that irradiate the high beam and the low beam, respectively.

Referring to FIG. 14, the light from the second light source 110b that forms the low beam light distribution pattern 320 may be partially blocked by a light blocking body (not illustrated) to form shaded lines 200.

Similarly to the previous exemplary embodiments, a pair of shaded lines 200a and 200b may be parallel to each other, and a distance between the pair of shaded lines 200a and 200b may be about the same as a vehicle width of the vehicle. The pair of shaded lines 200a and 200b may be parallel to the proceeding direction of the vehicle, and may have a brightness value or less. In addition, the pair of shaded lines 200a and 200b may be formed within a predetermined distance from the vehicle, and the predetermined distance may be about 25 m toward the front side from the vehicle.

Additionally, the system for controlling a head lamp for a vehicle may further include a controller configured to operate the second head lamp, and the pair of shaded lines may be formed or released by a control signal of the controller.

Figure 15:
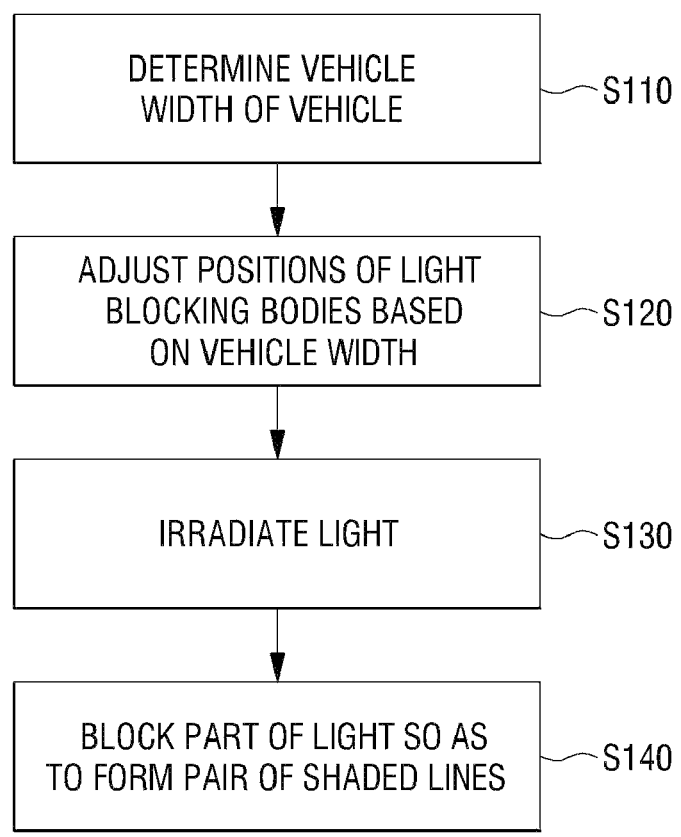
FIG. 15 is an exemplary flow chart illustrating a method for controlling a head lamp for a vehicle according to the exemplary embodiment of the present invention.

Moreover, the pair of shaded lines 200a and 200b may be formed when the second head lamp is turned on. In particular, the pair of shaded lines 200a and 200b may also be formed when the illuminance of the exterior of the vehicle 100 is a predetermined illuminance or less, and may also be formed in conjunction with the light distribution pattern in any one mode of the plurality of modes of the adaptive front lighting system. Hereinafter, a method for controlling a head lamp for a vehicle according to an exemplary embodiment of the present invention will be described with reference to FIG. 15. FIG. 15 is an exemplary flow chart illustrating a method for controlling a head lamp for a vehicle according to the exemplary embodiment of the present invention.

Referring to FIG. 15, the method for controlling a head lamp for a vehicle may include determining, by a controller, a vehicle width of a vehicle (S110), adjusting, by the controller, positions of light blocking bodies disposed at front sides of light sources based on the vehicle width (S120), irradiating, by the controller, light from the light sources (S130), and blocking, by the controller, a part of the light to form a pair of shaded lines spaced apart from each other at about the same distance as the vehicle width (S140).

First, the vehicle width of the vehicle that corresponds to a width of the shaded line may be determined (S110). The shaded line and the vehicle width may coincide with each other or may be substantially the same as each other within an error range or an undistinguishable range of the vehicle driver. In particular, a vehicle width of a vehicle to which the systems for controlling a head lamp for a vehicle according to the exemplary embodiments of the present invention are applied may be determined. As described above, the vehicle width may be determined as a width between the left and right outermost lines of the vehicle, for example, a width between the outermost points of the left and right side mirrors.

Furthermore, the positions of the light blocking bodies disposed at the front sides of the light sources based on the vehicle width may be adjusted (S120). The light blocking body may have a structure that forms a shaded line, and the operation of the light blocking body may be started or stopped by the controller. For example, the light blocking body may be included in both the left and right head lamps, and the light blocking body of the left head lamp may form a left shaded line of the light distribution pattern, and the light blocking body of the right head lamp may form a right shaded line of the light distribution pattern. As described above, when the pair of shaded lines are formed, for the width of the pair of shaded lines to correspond to the vehicle width, the position and the size of the light blocking body disposed at the front side of the light source may be operated to configure the pair of shaded lines having the width that corresponds to the vehicle width at the front side of the vehicle, by collectively considering an irradiation angle of the light source, a distance between the head lamps, a height of the vehicle.

Additionally, the light may be irradiated from the light sources (S130), and a part of the light may be blocked to form the pair of shaded lines spaced apart from each other at about the same distance as the vehicle width (S140). The pair of shaded lines formed may be parallel to each other, and may be parallel to the proceeding direction of the vehicle. The pair of shaded lines may have a brightness of a predetermined brightness value or less. In addition, the pair of shaded lines may be formed within a predetermined distance from the vehicle, and the predetermined distance may be about 25 m toward the front side from the vehicle, but is not limited thereto.

Further, a pair of shaded lines 200a and 200b may be formed when the head lamps are turned on. In particular, the pair of shaded lines 200a and 200b may also be formed when the illuminance of the exterior of the vehicle 100 is a predetermined illuminance or less, and may also be formed in conjunction with the light distribution pattern in any one mode of the plurality of modes of the adaptive front lighting system.

As described above, according to the system and the method for controlling a head lamp for a vehicle of the exemplary embodiments of the present invention, the pair of shaded lines that correspond to the vehicle width may be formed on the light distribution pattern irradiated to the front side of the vehicle to allow the vehicle to be driven safely or for vehicle to be parked in a narrow space based on the pair of shaded lines. In addition, the pair of shaded lines by which the driver may recognize the vehicle width maybe formed, thereby preventing an unintentional minor collision with other vehicles, bicycles, or motorcycles, or an injury accident.

The foregoing is illustrative of the present invention and is not to be construed as limiting thereof. Although a few exemplary embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the exemplary embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A system for controlling a head lamp for a vehicle, comprising:
    a first head lamp configured to block a part of a first light emitted from a first light source to form a first shaded line on a front road of a vehicle; and
    a second head lamp configured to block a part of a second light emitted from a second light source to form a second shaded line on the front road of the vehicle,
        wherein a distance between the first shaded line and the second shaded line is based on a vehicle width; and wherein the first shaded line that extends from the first light source and the second shaded line that extends from the second light source are formed to extend a predetermined distance from the vehicle.

2. The system of claim 1, further comprising:
a controller configured to operate the first head lamp and the second head lamp,
wherein the first shaded line and the second shaded line are formed or released by a control signal of the controller.

3. The system of claim 1, wherein the first head lamp and the second head lamp configure a left head lamp and a right head lamp of the vehicle, respectively.

4. The system of claim 1, wherein the first shaded line and the second shaded line are formed when the first head lamp and the second head lamp are turned on.

5. The system of claim 1, further comprising:
a shaded line adjusting switch operated by the controller,
wherein the first shaded line and the second shaded line are formed when the shaded line adjusting switch is turned on, and the first shaded line and the second shaded line are removed when the shaded line adjusting switch is turned off.

6. The system of claim 1, wherein the first shaded line and the second shaded line are formed when the vehicle is driven at a predetermined speed or less.

7. The system of claim 1, wherein the first shaded line and the second shaded line are formed when the illuminance of the exterior of the vehicle is a predetermined illuminance or less.

8. The system of claim 1, wherein the first shaded line and the second shaded line are formed in conjunction with a light distribution pattern in one mode of a plurality of modes of an adaptive front lighting system.

9. A system for controlling a head lamp for a vehicle, comprising:
a first head lamp configured to form a high beam light distribution pattern at a front side of a vehicle; and
a second head lamp configured to form a low beam light distribution pattern at the front side of the vehicle,
wherein the second head lamp forms a pair of shaded lines in a part of the low beam light distribution pattern,
wherein a distance between the pair of shaded lines is based on a vehicle width; and
wherein the pair of shaded lines extend from the second headlamp and are formed to extend a predetermined distance from the vehicle.

10. The system of claim 9, further comprising:
a controller configured to operate the second head lamp,
wherein the pair of shaded lines are formed or released by a control signal of the controller.

11. The system of claim 9, wherein the pair of shaded lines are formed when the second head lamp is turned on.

12. The system of claim 11, further comprising:
a shaded line adjusting switch operated by the controller,
wherein the pair of shaded lines are formed when the second head lamp is turned on and the shaded line adjusting switch is turned on, and the pair of shaded lines are removed when the shaded line adjusting switch is turned off.

13. The system of claim 9, wherein the pair of shaded lines are formed when the vehicle is driven at a predetermined speed or less.

14. The system of claim 9, wherein the pair of shaded lines are formed when the illuminance of the exterior of the vehicle is a predetermined illuminance or less.

15. The system of claim 9, wherein the pair of shaded lines are formed in conjunction with a light distribution pattern in one mode of a plurality of modes of an adaptive front lighting system.

16. A method of controlling a head lamp of a vehicle, the method comprising:
determining, by a controller, a vehicle width;
adjusting, by the controller, positions of light blocking bodies disposed at front sides of light sources based on the vehicle width; and
irradiating, by the controller, light from the light sources,
wherein a part of the light is blocked to form a pair of shaded lines spaced apart from each other based on the same distance as the vehicle width; and
wherein the pair of shaded lines extend from the light source are formed to extend a predetermined distance from the vehicle.

17. The method of claim 16, further comprising:
turning on, by the controller, a shaded line adjusting switch to form the pair of shaded lines; and
turning off, by the controller, the shaded line adjusting switch to remove the pair of shaded lines.

18. The method of claim 16, wherein the pair of shaded lines are formed when the vehicle is driven at a predetermined speed or less.

* * * * *